Sept. 16, 1941.  C. S. HAZARD ET AL  2,255,883
REGISTER DRIVE FOR DISPENSING PUMPS
Filed Jan. 27, 1937  3 Sheets-Sheet 1

INVENTORS
Charles S. Hazard
BY William L. Marden
ATTORNEYS

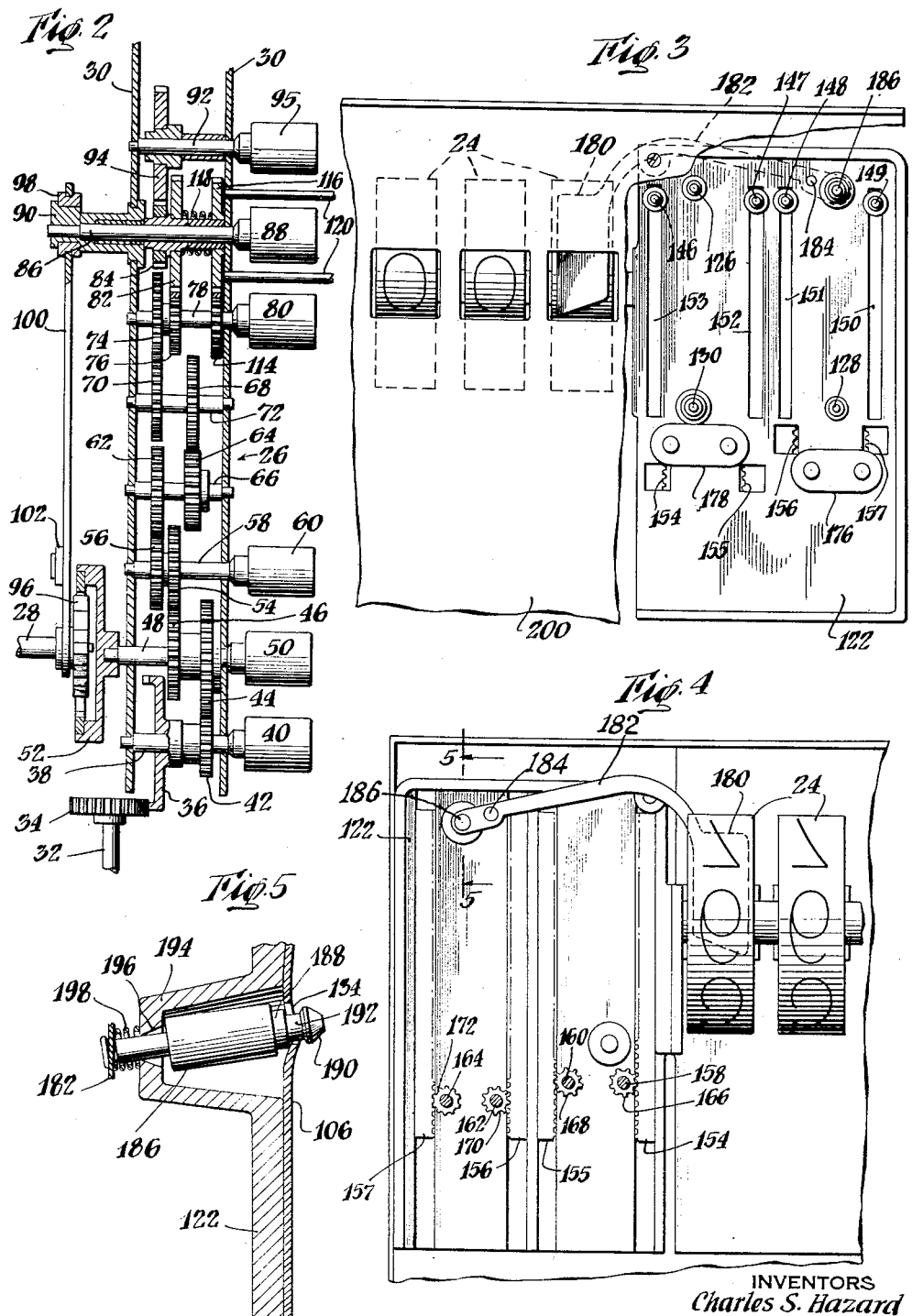

Sept. 16, 1941.  C. S. HAZARD ET AL  2,255,883
REGISTER DRIVE FOR DISPENSING PUMPS
Filed Jan. 27, 1937  3 Sheets-Sheet 3
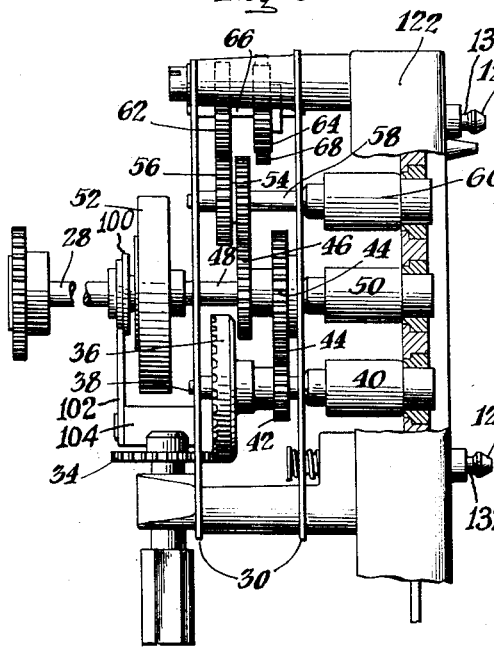
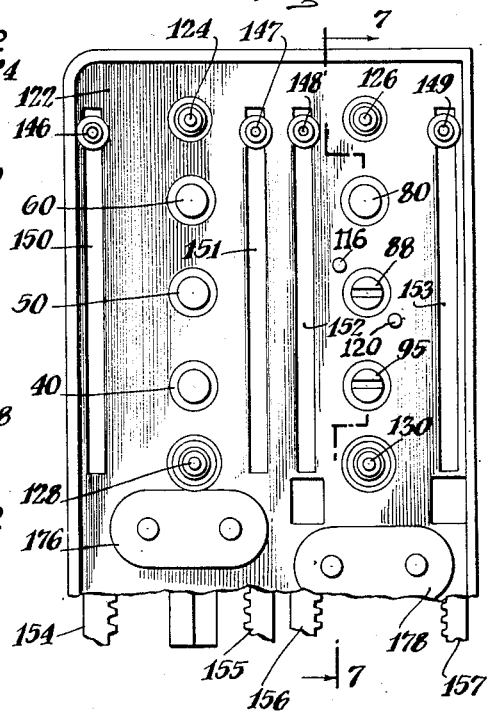
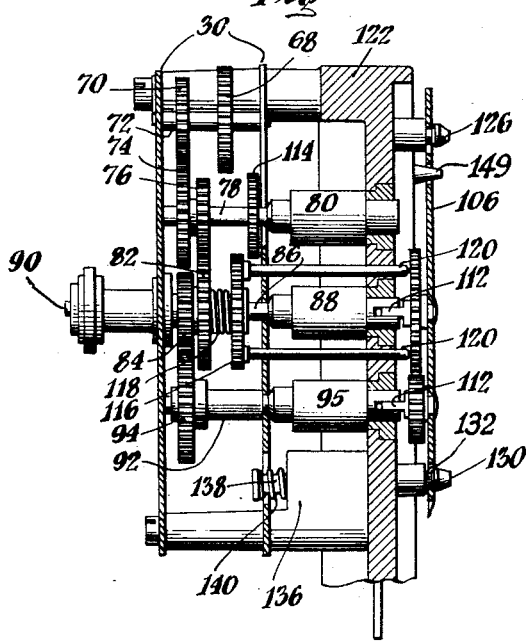
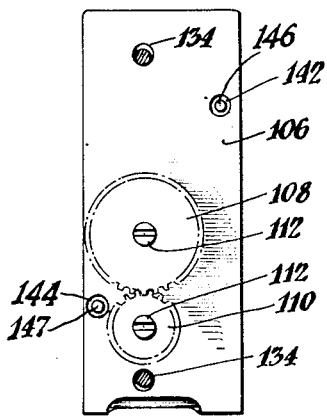
INVENTORS
*Charles S. Hazard*
BY *William L. Marden*
ATTORNEYS Patented Sept. 16, 1941

2,255,883

UNITED STATES PATENT OFFICE 2,255,883

REGISTER DRIVE FOR DISPENSING PUMPS

Charles S. Hazard, New York, and William L. Marden, Jackson Heights, N. Y., assignors to Neptune Meter Company, a corporation of New Jersey Application January 27, 1937, Serial No. 122,528

4 Claims. (Cl. 40—63)

This invention relates to improvements in cash computers for dispensing devices, and particularly relates to improved means for causing interconnected volume and cost registers to accurately register the cost of any volume of liquid dispensed in accordance with the indicated price of a predetermined unit volume of liquid.

In cash computers of the type disclosed in the Charles S. Hazard Patent No. 2,069,184, granted January 26, 1937, price targets bearing price indications may be interchangeably attached to the dispensing device for varying the rate at which the register is driven in response to the price of the liquid per unit volume on the price target.

The form of cash computers specifically described in said patent is of the subtractive type, that is, the gear train which drives the cost register normally tends to produce a product indication on the register which is one cent in excess of the price indicated on the whole cents target per unit volume. To reduce the product indication to the price indicated by the target, a zero cents target having meshing gears of the proper ratio, operating in the gear train, is attached to the device to subtract one cent from the product indication per unit volume. Likewise, to obtain a fractional cents indication, fractional cents targets may be substituted for the zero cents target and the difference between the fraction on the target and one cent is subtracted from the product which would otherwise be indicated by the cost register.

The present invention relates to constructions for preventing the operator of the dispensing device from obtaining a price advantage over the price indicated by the price targets on either side of the dispensing device.

More specifically, the construction may embody gearing forming a part of the cash computer gear train which gearing normally causes the cash computer to operate as though the zero cents target were in place, that is, causes the register to indicate the cost of the volume of liquid dispensed at the price per unit volume indicated on the whole cents target. This gearing is preferably arranged to be rendered inoperative upon attachment of a zero or fractional cents target.

The invention further may include means for preventing the display on different or opposite sides of a dispensing pump, of cost indications exceeding the cost corresponding to the price displayed on any side or dial of the pump. This may be accomplished by preventing the use of price targets having different price indications on opposite sides of the dispensing device. Such a construction requires both sets of targets to be identical, or in the alternative the targets on one side must be left off. In the typical construction hereinafter described, if the whole cents target is left off the face plate on one side of the dispensing device, the cost register will not operate, whereas if the fractional cents target is omitted the attendant will lose because the device thus operates at the rate for the lowest whole number. In the alternative, if the fractional cents target is left off the face plate on the other side, the register cannot be read whereas, if the whole cents target is not attached, the price displayed will obviously be incorrect, making reference to the other registers necessary.

One of the objects of the present invention is to provide a registering means for dispensing pumps having means for indicating a variable factor representing volume of liquid dispensed and means for indicating the product of the variable factor and a fixed price factor, the product indication representing the cost of the liquid dispensed, together with means for varying the operation of the product indicator which prevent the attendant from taking advantage of a patron either intentionally or accidentally.

Another object of the invention is to provide a liquid dispensing device having a plurality of registers, each indicating the volume or cost of liquid dispensed with means preventing the display of a cost indication differing from that corresponding to the price indicated.

A further object of the invention is to provide a dispensing device with means which normally tend to prevent operation of a cost indicator at a rate exceeding the price of the commodity dispensed.

Another object of the invention is to provide a dispensing device with price displaying and cost indicating means and means to prevent the display of a cost by said indicating means which differs from that corresponding to the price on said displaying means.

These and other objects and features of the invention will appear from the following description thereof in which reference is made to the accompanying figures of the drawings wherein a typical embodiment of the invention is disclosed.

For a better understanding of the present invention, reference may be had to the accompanying drawings in which:

Figure 2 is a diagrammatic showing of the gear relationship of a typical form of cash computer gear train embodying the present invention;

Figure 3 is a fragmentary view of the left side of the device illustrated in Figure 1, with the face plate in place and partly broken away;

Figure 4 is a rear view of the fragmentary portion of the device disclosed in Figure 3;

Figure 5 is an enlarged sectional view partly broken away, taken on line 5—5 of Figure 4;

Figure 6 is a side elevation of a typical form of price computer gear train embodying the present invention;

Figure 7 is a sectional view of the gear train taken on line 7—7 of Figure 8;

Figure 8 is a front elevation of the price computer housing shown in Figure 6; and Figure 9 is a rear view of a typical form of price target for use with the price computer shown in Figures 6 to 8.

Figure 1:
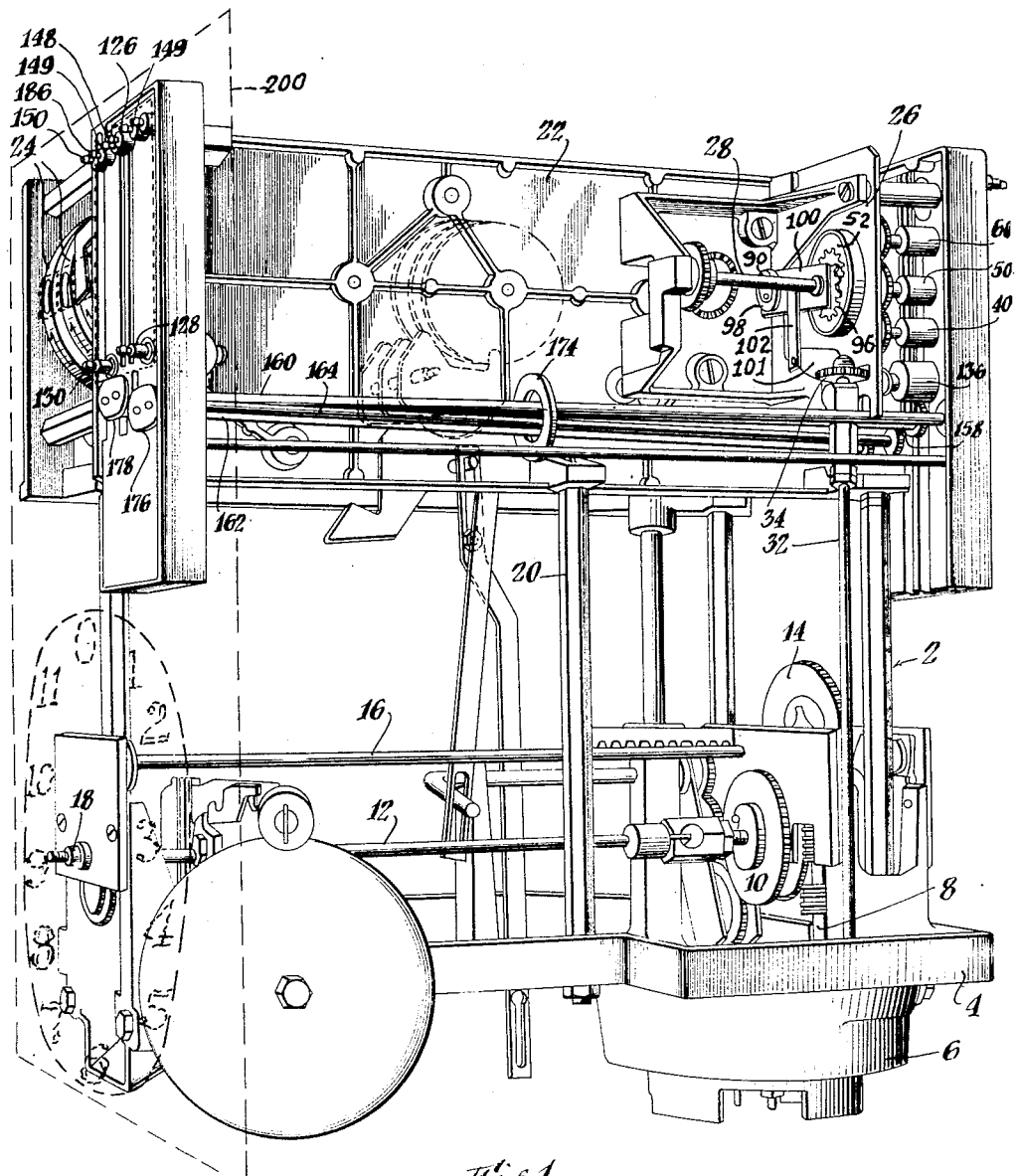
Figure 1 is a perspective view of a typical form of combined cost and volume register, embodying the present invention, with parts removed to disclose its construction and with one face plate and dial shown in dotted lines.

Illustrative of one form of the invention, Figure 1 discloses a typical embodiment of a cost register and volume register assembly suitable for disposal in a dispensing pump housing to be operated by passage of liquid through a meter to indicate a variable factor on one register representative of the volume of the liquid dispensed and on the other register the product of the variable factor and a fixed factor indicated by price targets which represents the cost of the total amount of the liquid dispensed. The register assembly may include a framework 2 consisting of a lower plate member 4 having a downwardly projecting collar 6 thereon, to which may be fastened a meter, not shown, of any desired type, such as, for example, a nutating disc or oscillating piston meter. Passage of liquid through the meter causes rotation of the shaft 8 which in turn through reduction gearing generally indicated as 10, drives a transverse shaft 12 at opposite ends of which are fixed pointers, not shown, travelling around the usual dial on the face plate 200 to make one complete revolution for every gallon of liquid dispensed. Suitable reduction gearing 14 may also be provided for driving a parallel shaft 16 connected through suitable gearing to hubs 18 journaled on shaft 16 for driving an additional pointer travelling over the dial on the face plate 200 to make a fractional revolution for every complete revolution of the pointers carried by shaft 12, whereby volume units and fractions of units of liquid may be registered on the dial. Suitable spacer rods 20 may be attached to the lower plate member 4 for supporting a cost register 22 of any desired type, such as for example, one of the conventional drum type consisting of a plurality of drums 24 for indicating the cost of the volume of liquid dispensed in terms of dollars and cents.

Suitable gearing may be provided between the meter and the cost register which can be varied in its driving effect in accordance with the price of a unit volume of liquid. The variable drive means, hereinafter called a price variator, is indicated at 26 on Figure 1, and is similar to that shown and described in the Hazard patent referred to above. The price variator is so connected to the cost register 22 that the driven shaft 28 actuated by the price variator 26 drives with 1:1 ratio the units drum on the cost register, that is, one revolution of shaft 28 causes one complete revolution of the units drum on the cost register, resulting in an indication of ten cents on the register.

Referring now to Figures 2, 6 and 7 for a better showing of the price variator 26, a typical form of the price variator may consist of a pair of spaced plates 30, between which are mounted a series of reduction gears driven by shaft 32 connected to the meter and driven independently of the shafts 12 and 16, shaft 32 and gear 34 meshing with and driving directly a crown gear 36 fixed to transverse shaft 38, said shaft being journaled between spaced plates 30 and carrying at its right-hand end, as viewed in Figures 2, 6 and 7, a socket member 40 for rotation therewith.

The crown gear 36, as illustrated, in turn drives directly a pinion 42. Pinion 42 meshes with and drives connected gears 44 and 46. Gears 44 and 46 may be suitably fixed to a sleeve rotatably mounted on a shaft 48 which is journaled in the side plates 30 and carries at its right-hand end a socket 50 and at its left-hand end an internal gear 52. A gear 46 meshes with and drives a pair of gears 54 and 56 fixed to a shaft 58 journaled in side plates 30 and carrying at its right-hand end a socket member 60. Rotation of shaft 58 through gear 56 is transmitted through idler pinions 62 and 64, each being fixed to an idler shaft 66 journaled in side plates 30 to another pair of idler pinions 68 and 70, the pinions 68 and 70 being carried by an idler shaft 72 journaled in side plates 30. Idler pinion 70 meshes with and drives a gear 74 and a pinion 76, both being fixed to a shaft 78, carrying at its right-hand end, as shown in Figures 2 and 7, a socket member 80. Pinion 76 in turn meshes with a gear 82 fixed to a pinion 84 which are journaled on a shaft 86 mounted in side plates 30, carrying at its right-hand end a socket 88 and at its left-hand end an eccentric 90. Rotation of pinion 84 also causes rotation of shaft 92 journaled in side plates 30, through a gear 94 fixed to shaft 92, the shaft also carrying at its right-hand end a socket 95.

Rotation of shaft 86 carrying the central socket member 88 as previously described, rotates an eccentric 90 for controlling the rate of drive of shaft 28 connected to the register 22 through a gear system consisting of the internal gear 52 and an orbitally movable gear 96 fixed to shaft 28. The eccentric 90 carries a sleeve 98 mounted in a link 100 for causing an oscillating movement of the link 100. The oscillatory movement of link 100 is transmitted to the gear 96 through a link 102 which is pivotally connected to a boss 104 on a side plate 30 and to an intermediate portion of the link 100, as best shown in Figure 2, whereby upon rotation of shaft 86 the gear 96 will be caused to move bodily in an orbital path in the same direction as internal gear 52 but at a lower rate of speed depending upon the effective action of the gear train above described.

Because of the construction of the gear train unless some means is provided for driving the shaft 48 carrying the internal gear 52 and socket 50 from either socket 40 or socket 60, no rotation of internal gear 52 can take place. Likewise, no rotation of shaft 86 carrying eccentric 90 and socket 88 will take place unless shaft 86 is driven by gearing from either socket 80 or socket 95. The rotation of shafts 48 and 86 is produced by the use of supplementary price targets of a type such as illustrated in Figure 9. These price targets may consist of a metallic plate 106 carrying a pair of meshing gears 108 and 110, each gear being provided with a similar projecting tongue 112 to be received in the two adjacent sockets 40—50, 50—60, 80—88 or 88—95. The gears 108 and 110 are varied in ratio in accordance with the price of the fluid dispensed, one target being required for each set of three sockets 40, 50, 60 and 80, 88, 95, to drive the shaft 48 from either the socket 40 or the socket 60 and to drive the shaft 86 from either socket 80 or 95. For example, the gear train of the price variator 26 is so related that when it is desired to drive shaft 48 so that the register 22 may indicate in accordance with a price from zero to, say, sixteen cents per gallon, the upper shaft 58 through socket 60 drives socket 50, shaft 48 and internal gear 52. When the price of the liquid is seventeen cents or above, shaft 38 drives shaft 48 through sockets 40 and 50 by means of gears 108, 110 of the proper ratio, carried by the price target 106. For fractions of a cent, a similar price target 106 and having gears 108 and 110 of a desired ratio, may be used in conjunction with sockets 80, 88, 95. When the price range indicated on the price target 106 is from zero to seven-tenths cents, the sockets 95 and 88 are connected by gears 110, 108 to drive eccentric 90 from shaft 92. When the fraction of a cent indicated on the target 106 is more than seven-tenths and less than one cent, the upper socket 80 drives shaft 86 and eccentric 90 through gears 110, 108.

The relation of the gearing of the price variator 26 is such that upon rotation of shaft 48 by either the upper or lower socket, shaft 28 will be so rotated that the register will indicate for each volume of liquid dispensed a cost one cent in excess of the price indicated on the price target in the abence of a zero or fractional cents target. That is, for example, if a price target 106 bearing an indication of ten cents per gallon is attached to the price variator with gears 108 and 110 in proper ratio inserted in sockets 60 and 50, upon the passage of one gallon of liquid through the meter the cost register 22 will indicate eleven cents on the drums 24. In order to properly correlate the price indication on the target with the cost indication on the register 22 it is therefore necessary to move the gear 96 with relation to the internal gear 52 in such a manner and at such a speed that one-tenth of a revolution of the units drum will be deducted or subtracted from the register cost indication. To produce this deduction it has heretofore been necessary to supply a zero cents target carrying gears of the proper ratio which engage in sockets 80 and 88 to cause the rotation of the eccentric so that the one cent deduction will take place. In order to include an indication of fractional cents per unit volume, additional targets must be supplied carrying gears of the proper ratio to deduct the difference between the fractional cents indication on the target and one cent from the price indication that would normally be on the cost register drums 24 if no target were present. This type of price variator is known as the subtractive type and as disclosed is similar to that shown in Charles S. Hazard Patent No. 2,069,184.

With the above described construction, if the zero cents price target is omitted intentionally or inadvertently, the register will indicate one cent higher per gallon than the price indicated on the whole cents target. To overcome this possibility, in accordance with the present invention, the price variator 26 has been modified by the addition of suitable gearing between the sockets 80 and 88 which normally receive the zero cents target's gears in order to automatically deduct one cent when that target is not in place. This construction may suitably consist of a gear 114 fixed to a shaft 78 and socket 80 which is adapted to mesh with a gear 116 slidably mounted on and keyed to eccentric shaft 86 for transmitting the rotation of shaft 78 directly to shaft 86 when no price target 106 is connected to the price variator. The gear ratios of gears 116 and 114 is the same as the ratio of the gears carried by the zero cents target. Gear 116 may be normally held in mesh with gear 114 by means of a spring 118 but is movable out of mesh with gear 114 upon fixing of a price target 106 on the price variator housing. Retraction of gear 116 may suitably be accomplished through the use of a pair of pins 120 bearing against the gear 116 projecting through the front of the price variator frame 122 to be engaged by the gear 108 on the price target 106 when it is forced into position. Removal of the price target 106 allows the spring 118 to force gear 116 into mesh with gear 114 thereby acting to produce the same result as the gears carried by the zero cents price target. Thus, with this construction the attendant or operator of the dispensing device cannot obtain a one cent price advantage per gallon over the customer by leaving off the zero cents target.

As illustrated in Figure 3, dispensing devices are usually provided with face plates 200 on the front and rear of the dispensing housing, exposing both the volume indicator and the price indicator. Only one side of this dispensing device, however, carries the price targets which control the price variator 26. Therefore, in prior devices it was possible that the controlling side of the pump could be placed in a position in which its price targets could not be seen and with the only non-controlling side of the pump exposed to view. The operator was thus enabled to use different value price targets on opposite sides of the dispensing pump and by improper selection of the price targets could create a price advantage in his favor. In order to overcome this advantage, the present invention includes a construction which prevents the use of different value price targets on opposite sides of the pump. Referring particularly to Figures 6, 7 and 8, a section of the frame 122 of the price variator is shown consisting preferably of a casting having fixed pins 124 and 126 at the upper portion of the frame and movable pins 128 and 130 at the lower portion of the frame, the pins being provided with undercut portions 132, as shown in Figures 6 and 7, which receive and lock the price targets 106 in place by engaging in aligned apertures 134 on a price target. The lowermost pins 128 and 130 are preferably mounted in similar bosses 136 in the price variator frame 122 and have shanks 138 projecting beyond the housing 136 about which are disposed springs 140 for holding the pin normal to the housing 122 (Figure 7). A price target 106 may be snapped over the pin 124 and the pin 128 displacing the latter slightly until the aperture 130 is received in the undercut portion 132, after which the spring 140 snaps the pin 128 into locking engagement with the price target. The pairs of pins 124 and 128, and 126 and 130, are preferably situated at different distances to one side of the center line of the price target so that the whole cents and fractional cents price targets may not be interchangeably attached to the wrong set of pins.

In order that corresponding price targets must be fixed on opposite sides of the dispensing pump housing, we have also provided the price targets with apertures 142 and 144 which bear a fixed relationship or a fixed position in similar value targets and bear a different relation in different value targets. The apertures 142 and 144 may receive either pins 146 and 147 or 148 and 149 slidably projecting through slots 150, 151, 152 and 153 in the price variator frame 122 and carried by racks 154, 155, 156 and 157, respectively, whereby the pins may be moved up and down the slots to be properly received in the particular apertures 142, 144 on the price targets 106. This construction is similar for both sides of the meter housing and for both of the pairs of price targets and control of movement of the racks and position of the pins is such that if a pin on one side of the housing is moved to a pre-determined position axially of the slot through which it projects, the pin corresponding to it on the opposite side of the housing is also moved to the same relative position. This is suitably accomplished through the medium of a number of shafts corresponding to the number of the racks 154, 155, 156 and 157. Referring particularly to Figures 1 and 4, the shafts 158, 160, 162 and 164 may be provided with gears 166, 168, 170, and 172, respectively, meshing with the racks 154, 155, 156 and 157 on opposite sides of the pump housing to cause the racks to move simultaneously into corresponding positions. These shafts 158, 160, 162 and 164 cross over each other in pairs, as indicated in Figure 1, and may be retained in their proper relationship by means of a ring 174. The price variator frames 122 may be suitably provided with bosses 176 and 178, for receiving and journaling the ends of the shafts 158, 160, 162 and 164. With this construction it will be understood that the position of the pins 146, 147, 148 and 149 in grooves 150, 151, 152 and 153 on one side of a dispensing pump housing will be exactly the same as the corresponding pins on the opposite side and therefore only the same value price targets can be positioned on opposite sides of the pump with the sole exception that some of the price targets may be left off one side of the dispensing device.

As previously described, the construction of the price variator 26 is such that by leaving off a price target on the control side no advantage may be obtained by the operator. In order to prevent the operator from leaving off a target on the non-controlling side of the dispensing pump and using targets on the controlling side, which might give him a price advantage, a construction has been provided which prevents reading of the cost register drums 24 on the non-controlling side if the fractional cents target is not attached thereto. This construction is best illustrated in Figures 3 and 4 and may consist of a shutter 180 movable in front of one of the drums 24 of the register 22 to prevent viewing of the same. The shutter is supported on an arm 182 pivotally connected at 184 to the price variator frame 122 and receiving loosely at its inner end a pin 186 (Figures 3 and 5) for latching price target 106 in place. This pin, as best shown in Figure 5, may consist of a shank portion 188 having a head 190 and a reduced neck 192. The cost register frame 122 may be provided with a boss 194 having an aperture 196 in the base thereof, allowing pivotal movement of the pin 188. The pin 188 is normally maintained in a position perpendicular to the frame 122 by means of a spring 198 bearing against the boss 194 and the end of the shutter arm 182 which is pivotally mounted on the pin 188 so that displacement of the head 190 of the pin 188 will cause a downward movement of the pin 186 and an upward movement of the shutter 180. As the pin 188 is normally disposed perpendicularly to the price variator frame 122, the shutter is normally retained in a position covering the portion of one of the drums 24 exposed through the register dial 200. When a price target 106 is placed on the pin, the target displaces the head 190 of the pin 188 upwardly and moves the shutter also upwardly to expose the drum through the register dial 200. This construction therefore necessitates the use of a fractional cents price target on the fractional cents side of the price variator and prevents the attendant from using only the unit cents target on the non-controlling side of the dispensing pump.

It will be understood from the foregoing that we have provided safety devices for a dispensing pump which will effectually prevent the attendant from obtaining a price advantage over the customer. It will also be understood that the disclosed embodiment may be varied widely without departing from the invention. Therefore the embodiment disclosed should be considered as illustrative only and not as limiting the scope of the following claims.

We claim:

1. In a registering device having means defining a plurality of indication display fields disposed in different directions, the combination of sets of targets provided with different indicia per set, each of said display fields being provided with engageable means shiftably mounted adjacent thereto, and means for operatively interconnecting the engageable means of said display fields, the targets of each set being provided with complementary means adapted to be engaged by said engageable means to insure attachment of targets of like indicia to each of said display fields at the same time.

2. In a registering device having means defining a plurality of indication display fields disposed in different directions, the combination of sets of targets bearing different indicia per set, the targets of each set being provided with attachment means characteristically located thereon, means shiftably mounted adjacent each of said display fields for engaging the attachment means of said targets for securing a set of targets adjacent said display fields, and means for operatively interconnecting the shiftable engaging means of each display field for maintaining same in corresponding positions for engagement with like targets only.

3. In a registering device having means defining a plurality of indication display fields disposed in different directions, the combination with said display fields of sets of targets, each set of targets being provided with a different indicia and correspondingly and characteristically located attachment means, shiftable racks associated with said display fields, means on said racks engageable with the attachment means on said targets, and elements operatively connecting corresponding racks to insure simultaneous movement thereof into positions in which the engageable means is adapted to engage only the attachment means of targets having the same indicia.

4. In a registering device having means defining a plurality of indication display fields disposed in different directions, the combination of sets of targets provided with different indicia per set, each of said display fields being provided with means for operatively connecting a target adjacent thereto, the targets of each set having corresponding connecting means different for each set, and means for operatively interconnecting the target connecting means of each of said display fields to insure operative association with said display fields of targets having like indicia.

CHARLES S. HAZARD.
WILLIAM L. MARDEN.